United States Patent
Schneider et al.

(10) Patent No.: US 6,700,907 B2
(45) Date of Patent: Mar. 2, 2004

(54) MACH-ZEHNDER MODULATOR BIAS AND DRIVER GAIN CONTROL MECHANISM

(75) Inventors: David Schneider, Melbourne, FL (US); James Allan Wilkerson, Jr., Satellite Beach, FL (US); James Vincent Wernlund, Indialantic, FL (US)

(73) Assignee: JDS Uniphase Corporation, San Jose, CA (US)

( * ) Notice: Subject to any disclaimer, the term of this patent is extended or adjusted under 35 U.S.C. 154(b) by 196 days.

(21) Appl. No.: 09/897,538

(22) Filed: Jun. 29, 2001

(65) Prior Publication Data

US 2002/0061034 A1 May 23, 2002

Related U.S. Application Data

(60) Provisional application No. 60/249,438, filed on Nov. 20, 2000.

(51) Int. Cl.[7] .................................................. H01S 3/10
(52) U.S. Cl. .......................... 372/26; 250/205; 359/181
(58) Field of Search ........................... 372/26; 250/205; 359/181

(56) References Cited

U.S. PATENT DOCUMENTS

| | | | |
|---|---|---|---|
| 5,003,264 A | 3/1991 | Koizumi et al. ............. 324/309 |
| 5,089,727 A | * 2/1992 | Molitor et al. .............. 307/570 |
| 5,170,274 A | 12/1992 | Kuwata et al. ............. 359/182 |
| 5,208,817 A | 5/1993 | Kao et al. ..................... 372/26 |
| 5,317,443 A | 5/1994 | Nishimoto ................... 359/187 |
| 5,343,324 A | 8/1994 | Le et al. ...................... 359/184 |
| 5,400,417 A | 3/1995 | Allie et al. ..................... 385/2 |
| 5,440,113 A | 8/1995 | Morin et al. ................. 250/205 |
| 5,453,608 A | 9/1995 | Conder et al. .............. 250/205 |
| 5,726,794 A | 3/1998 | Tajima ........................ 359/249 |
| 5,742,268 A | 4/1998 | Noda ........................... 345/84 |
| 5,805,328 A | 9/1998 | Satoh et al. ................. 359/245 |
| 5,900,621 A | 5/1999 | Nagakubo et al. .......... 250/205 |
| 5,907,426 A | 5/1999 | Kato et al. .................. 359/239 |
| 5,917,637 A | 6/1999 | Ishikawa et al. ............ 359/181 |
| 6,091,535 A | * 7/2000 | Satoh .......................... 359/239 |

* cited by examiner

Primary Examiner—George Eckert
Assistant Examiner—Joseph Nguyen
(74) Attorney, Agent, or Firm—Allen, Dyer, Doppelt, Milbrath & Gilchrist, P.A.

(57) ABSTRACT

A microcontroller-based controller executes interleaved DC bias and gain control routines using monitored values of the monitored photocurrent output signal of a Mach-Zehnder laser modulator to derive a gain setting for the modulation drive signal and a bias level setting for the DC bias level, without tuning or adjustment. Subsequent to convergence of the gain and bias level settings, the control unit may repetitively interrupt and restart the DC bias and gain control routine at intervals that are staggered in a random time fashion, to achieve spectral dispersion of the gain and bias level settings, and provide insensitivity to periodic environmental noise.

12 Claims, 2 Drawing Sheets

MACH-ZEHNDER MODULATOR BIAS AND DRIVER GAIN CONTROL MECHANISM

CROSS-REFERENCE TO RELATED APPLICATION

The present application claims the benefit of co-pending U.S. Provisional Application Ser. No. 60/249,438, filed Nov. 20, 2000, by D. Schneider et al, entitled: "Mach-Zehnder Modulator Bias and Driver Gain Control Algorithm," assigned to the assignee of the present application and the disclosure of which is incorporated herein.

FIELD OF THE INVENTION

The present invention relates in general to optical communication systems and components therefor, and is particularly directed to a microcontroller-based mechanism for performing closed loop control of both the bias and gain of a Mach-Zehnder (MZ) optical transmitter without the need for tuning or adjustment.

BACKGROUND OF THE INVENTION

FIG. 1 diagrammatically illustrates a typical external laser modulator architecture for a digital optical transmitter, such as that employed for use in a very high data rate (e.g., on the order of 10 Gb/s or higher) optical communication system. As shown therein the optical transmitter employs a laser modulator 10, such as an X-cut lithium niobate (LN) Mach Zehnder (MZ) modulator, that is external to and disposed in the output beam path 12 of a continuous wave laser 14. The LN MZ modulator 10 has a first, drive signal (data) port 11 to which a digital drive signal is applied, and a second, DC bias port 13 to which a DC bias voltage is coupled. The drive signal is supplied from the output 23 of an analog driver 20, which has a signal input 21 coupled to a digital RF signal source 22 and a drive (gain) control port 24 coupled to receive a drive amplitude control voltage. The DC bias voltage is supplied from an output 33 of a bias controller 30, which has a DC voltage input 31 coupled to receive a DC control voltage.

In an effort to sustain long-term, stable operation of the laser modulator 10, compensation for environmental effects, such as temperature and aging (which is especially important for telecom and datacom applications), the DC control voltage to the DC bias controller 30 is coupled to a first reference oscillator tone-based closed loop control path 35. This control path is used to monitor the beam output of the laser modulator, and to adjust the control voltage input to the bias controller 30, as necessary, to ensure that the DC voltage bias necessary for proper modulator operation is coupled to DC bias port.

In addition, in order for the modulator drive signal to track changes in the modulation efficiency slope, a second, reference oscillator tone-based closed loop control path 25 is coupled to monitor the output of the laser modulator. This second closed loop control path is operative to controllably adjust the DC input to the analog driver 20, in order to maintain a constant optical extinction ratio of the modulator.

Because this architecture employs tones/frequencies for signal drive control and DC bias adjustment, not only are different tuning channel circuits required, but they must include filter/isolation circuitry for reducing/minimizing interaction or cross-coupling of one control channel into the other.

For an illustration of non-limiting examples of patent literature describing prior art laser modulator architectures, including the tone-based optical transmitter control mechanism of the type employed in FIG. 1, attention may be directed to the following U.S. Pat. Nos.: 5,317,443; 5,742,268; 5,805,328; 5,917,637; 5,907,426; 5,400,417; 5,003,264; 5,343,324; 5,453,608; 5,900,621; 5,440,113; 5,170,274; 5,208,817; and 5,726,794.

SUMMARY OF THE INVENTION

In accordance with the present invention, shortcomings of conventional tone-based laser modulator control schemes, including those employed in the systems of the above-referenced patent literature, are effectively obviated by a microcontroller-based laser modulator control mechanism, that is operative to perform closed loop bias and gain control of the transmitter without tuning or adjustment. Independence from tuning is achieved by relying on the transfer function slope, or zero derivative at convergence, and the change in sign of the derivative for small perturbations in the control settings. Once converged, no further adjustment is required, and the control mechanism of the invention may be turned off for extended periods of time to save power. Advantageously, the period of time during which perturbations are created may be staggered in a random time fashion to achieve spectral dispersion of the control signals and provide insensitivity to periodic environmental noise.

As will be described, the invention executes a modulator bias and gain optimization routine that contains respective bias and gain control subroutines, that are executed in a time-interleaved manner, using feedback current extracted at the output of (a photodiode coupled to) the Mach-Zehnder waveguide. In accordance with this composite routine, once initial values for bias and gain have been set to 'best guess' parameters at the convergence point, a bias control subroutine is executed, followed by a gain control subroutine.

The bias control subroutine derives the peak of the sinusoidal Mach-Zehnder function, where the derivative is zero and the slope of an induced error signal has the correct sign. This bias control subroutine therefore depends on the shape of the transfer function and not on the absolute values of the control or feedback signals. The monitored feedback current from of a modulator output photosensor is sampled and stored as a "nominal" signal value, and the modulator gain is offset by a small percentage from its initial value, so as to increase the transfer function gain. By inducing an intentional error, the offset increases the sensitivity of the measurement.

The feedback photocurrent signal is then sampled again and stored as a "delta" signal. The previously derived "nominal" signal is subtracted from this "delta" signal in order to provide a derivative or Mach-Zehnder transfer function slope. If the difference value is less than or equal to a prescribed value (e.g., zero), the 'bias' is incremented. If the difference value is greater than the prescribed value (zero), the 'bias' parameter is decremented. The values by which the bias parameter is selectively modified can be fixed values, or a function of the magnitude of the "nominal" value.

Once the bias subroutine is completed, the gain value is restored to its initial setting and the monitored photodiode output signal is again sampled and stored as a "nominal" signal value. The modulator "bias" value is increased by a small percentage to increase the transfer function gain. Similar to the bias control loop, the purpose of the offset in the gain control subroutine is to increase the transfer function gain at the settling point. The photodiode output current signal is sampled and stored as a "delta" signal, and the stored "nominal" signal is then subtracted from the delta signal to derive a difference value.

Like the bias subroutine, the gain control loop uses the shape of the transfer function to settle to the location where the derivative is zero, and the slope of an induced error signal has the correct sign. If the difference value is less than or equal to the prescribed value (zero), the 'gain' parameter is incremented. If the difference value is greater than the prescribed value, the 'gain' parameter is decremented. Once the gain control loop is completed, the bias value is restored to its initial setting and the modulator control routine is then repeated indefinitely.

The offsets and measurements performed in the bias and gain control subroutines need not be repeated within the same period of time. Preferably, the repetition intervals are staggered relative to one another, in order to prevent the generation of a distinct modulation tone, with the energy being distributed over a larger range of frequencies, so as to minimize sensitivity to data harmonics of repetitive patterns and system noise. In order to reduce sensitivity to harmonic interferers in-band of the control loop bandwidth, and minimize impact to the modulated data stream for improved performance, the repetition intervals may be staggered in a pseudo random manner as employed in spread spectrum techniques. Once a control loop has settled, its associated subroutine may be interrupted, and placed in a power down mode; the subroutine may be periodically rerun, to compensate for aging and temperature variations, with no penalty to operating margins. This allows for extremely low power operation.

The microcontroller-based bias and gain control routine of the invention offers a number of improvements over conventional modulator control schemes. It requires no adjustments, and is readily coupled with signal access points of currently commercially available MZ modulators. This allows it to be readily incorporated into an existing Mach-Zehnder modulator architecture with little or no impact on its physical dimensions. Further, it optimizes bias and gain settings, compensating for external component DC offsets, which are a function of selection, time or environment. Moreover, the invention is data rate insensitive, and may be stalled for extended periods of time to save power.

DETAILED DESCRIPTION

Figure 1:
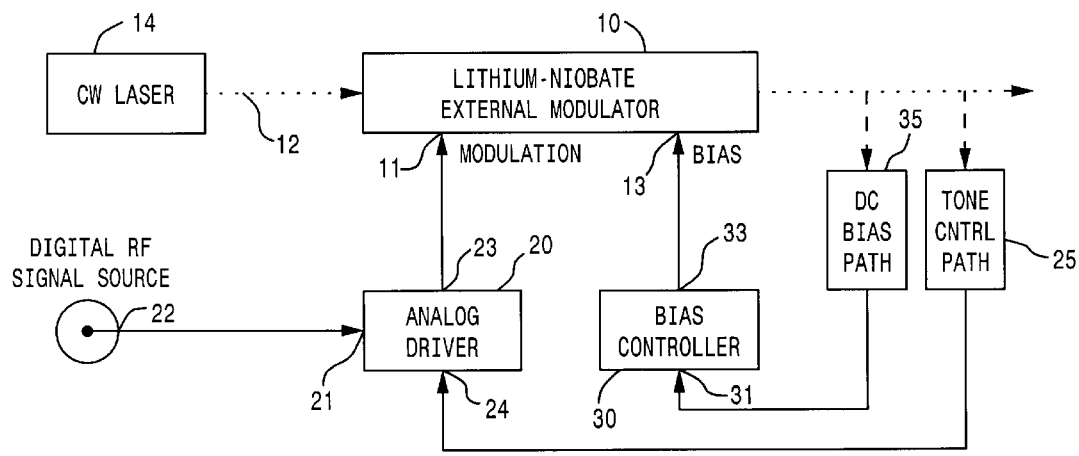
FIG. 1 diagrammatically illustrates a conventional laser modulator architecture, having respectively different tone-based, closed loop control paths for adjusting signal drive and DC bias inputs to the modulator.

Before detailing the new and improved microcontroller-based closed loop bias and gain control of a laser modulator in accordance with the present invention, it should be observed that the invention resides primarily in prescribed modular arrangements of conventional opto-electronic and electronic circuits and components, and an associated digital controller therefor. In a practical implementation that facilitates their incorporation with existing laser modulators used in high data rate telecommunication equipment and the like, these modular arrangements may be readily implemented in an application specific integrated circuit (ASIC) chip. As a consequence, the configuration of such arrangements of circuits and components and their operation have, for the most part, been illustrated in the drawings by a readily understandable block diagram, which shows only those specific details that are pertinent to the present invention, so as not to obscure the disclosure with details which will be readily apparent to those skilled in the art having the benefit of the present description herein. Thus, the diagrammatic illustrations are primarily intended to show the major components of the invention in a convenient functional grouping, whereby the present invention may be more readily understood.

Figure 2:
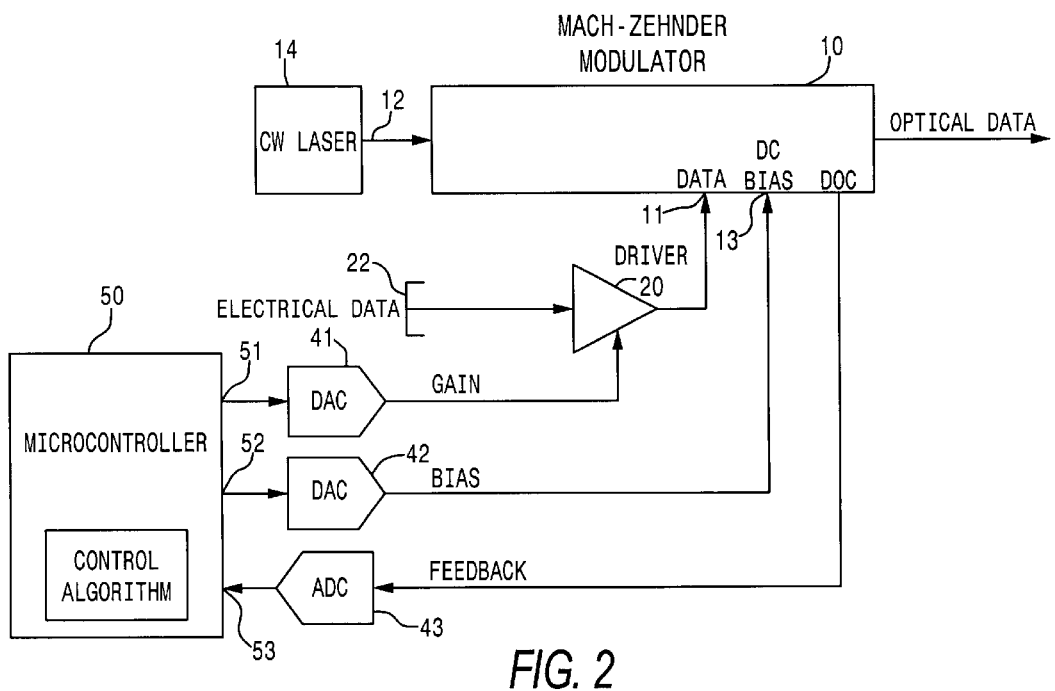
FIG. 2 diagrammatically illustrates the architecture of a microcontroller based mechanism for performing closed loop bias and gain control of a Mach-Zehnder optical transmitter in accordance with the invention.

The overall configuration of the laser modulator control architecture of the present invention is shown diagrammatically in FIG. 2 as comprising a laser modulator 10, such as an X-cut lithium niobate (LN) Mach Zehnder (MZ) modulator, referenced above, which is arranged in output beam path 12 of continuous wave laser 14. The LN MZ modulator 10 has a modulation or data drive port 11, to which a digital RF drive signal is supplied from an analog signal driver 20, and a DC bias port 13, to which a DC bias voltage is coupled. The analog driver 20 is coupled to receive a digital RF signal (electrical data) from a signal input port 22, and a drive amplitude (gain) control voltage.

The gain control voltage is supplied from a first digital-to-analog converter (DAC) 41, that is coupled to a digital gain control port 51 of a control processor (microcontroller) 50. The DC bias voltage is supplied from a second digital-to-analog converter (DAC) 42, coupled to a digital bias control port 52 of the microcontroller 50. The microcontroller 50 has a digital input port 53 coupled to the output of an analog-to-digital converter (ADC) 43 installed in a feedback path to a port DOC through which the output of the Mach-Zehnder modulator is monitored. For this purpose, an optical detector, such as a photodiode, is optically coupled to a portion of the modulator waveguide, and is operative to generate a current Is proportional to the magnitude of the transmitted optical power output by the modulator 10. This monitored current signal Is provided at port DOC is fed back to ADC 43.

As pointed out briefly above, the microcontroller 50 executes a modulator bias point optimizing routine which non-disruptively minimizes system bit errors by the establishment of a data eye pattern crossing at or substantially about fifty percent. In particular, the driver gain control routine non-disruptively optimizes the peak-to-peak swing of the electrical data signal output by the data driver 20. If it is too small (less than optimum) or too large (greater than optimum), the peak-to-peak swing will reduce the optical transmitter's extinction ratio and decrease the signal-to-noise ratio.

Figure 3:
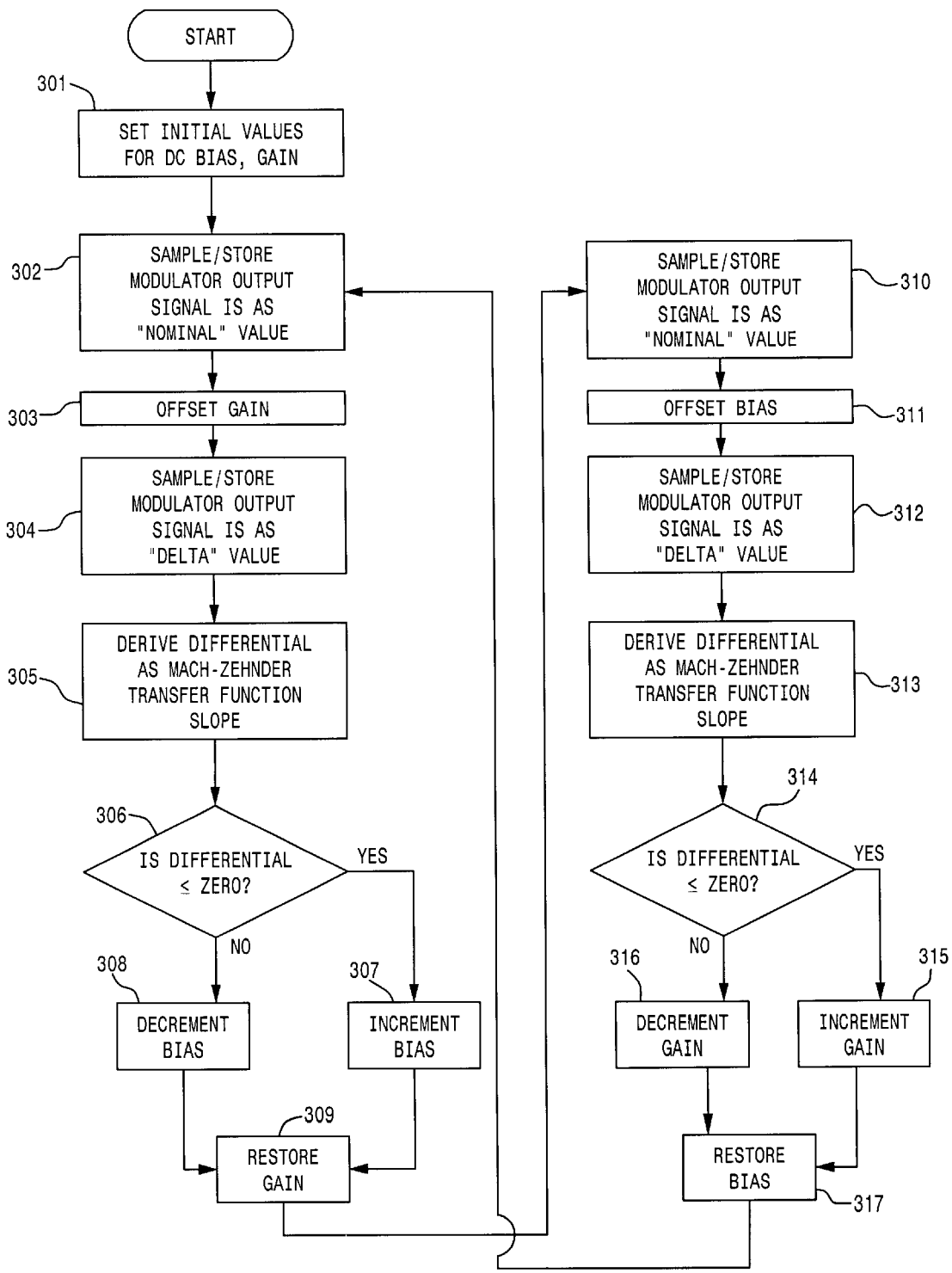
FIG. 3 is a flow chart showing respective steps of the control mechanism employed in the optical transmitter of FIG. 2.

The two gain and DC bias control subroutines, shown in the flow chart of FIG. 3, are carried out in a time-interleaved manner, sharing the feedback current signal Is supplied by the output DOC of the Mach-Zehnder waveguide. More particularly, as shown at a precursor conditioning step 301, initial values for bias and gain are set to prescribed 'best guess' parameters at the convergence point. In a first step 302 of a bias control subroutine, the photodiode output signal Is representative of the output of the modulator is sampled and stored as a "nominal" signal value. In step 303, the modulator gain value is then increased or 'offset' by a small percentage from its initial setting, so as to increase the transfer function gain.

The purpose of this gain offset in the bias control subroutine is to increase the transfer function gain at the settling point. The routine settles to where the derivative of the monitored output photocurrent Is small or ideally zero. By inducing an intentional error, the offset increases the sensitivity of the measurement. The offset should be a small perturbation to minimize its impact on the system. The perturbations should generate an offset, which is a small fraction of the nominal bias value, so as to not noticeably impact performance or distort the optical signal to be transmitted by the modulator.

Next, in step 304, the photodiode signal Is is sampled and stored as a "delta" signal value. In step 305, a differential between the the "nominal" signal obtained in step 302 and the "delta" signal obtained in step 304 is derived. This differential may be derived by subtracting the "nominal" signal obtained in step 302 from the "delta" signal obtained in step 304, and represents the derivative or Mach-Zehnder transfer function slope. The objective of the bias control loop is to derive the peak of the sinusoidal Mach-Zehnder function, where the derivative is zero and the slope of an induced error signal has the correct sign. The subroutine therefore depends on the shape of the transfer function and not on the absolute values of the control or feedback signals.

For this purpose, in query step 306, the difference value obtained in step 305 is compared with a prescribed value (e.g., zero). If the difference value is less than or equal to the prescribed value (zero), so that the answer to query step 306 is YES, the 'bias' parameter (from step 301) is incremented by a prescribed value, as shown at step 307. On the other hand, if the answer to query step 306 is NO (the difference value is greater than the prescribed value (zero), in step 308, the 'bias' parameter is decremented by a prescribed value. The values by which the bias parameter is selectively incremented or decremented can be fixed values, or they may be a function of the magnitude of the "nominal" value.

As a precursor to conducting the gain adjustment subroutine, in step 309, the gain value is restored to its initial setting (as set in step 301). At a first step 310 in the gain adjustment subroutine, the monitored photodiode output signal Is is again sampled and stored as a "nominal" signal value. In step 311, the modulator "bias" value is increased or offset by a small percentage to increase the transfer function gain. Similar to the bias control loop, the purpose of the offset in the gain control subroutine is to increase the transfer function gain at the settling point. Next, in step 312, the photodiode signal is sampled and stored as a "delta" signal. In step 313, a differential between the value of the "nominal" signal and the delta signal is obtained (as by subtraction) to derive a difference value.

Like the DC bias subroutine, described above, the gain control loop uses the shape of the transfer function to settle to the location where the derivative is zero, and the slope of an induced error signal has the correct sign. To this end, in query step 314, the difference value is compared to a prescribed value (e.g., zero). If the difference value is less than or equal to the prescribed value (zero), so that the answer to query step 314 is YES, the 'gain' parameter is incremented by a prescribed value, as shown at step 315. On the other hand, if the answer to query step 314 is NO (the difference value is greater than the prescribed value), in step 316, the 'gain' parameter is decremented by a prescribed value. As in the case of bias control, the values by which the gain parameter is selectively incremented or decremented can be fixed values, or they may be a function of the magnitude of the "nominal" value.

As a precursor to repeating the gain adjustment subroutine, described above, in the next step 317, the bias value is restored to its initial setting (as set in step 301). Having completed each of the bias and gain control subroutines, described above, the modulator control routine then loops back to step 302, and the bias and gain control process described above is repeated indefinitely.

It may be noted that the offsets and measurements performed in the above-described bias and gain control subroutines need not be repeated within a prescribed period of time. Preferably, the repetition intervals are relatively staggered to prevent the generation of a distinct modulation tone, distributing the energy over a larger range of frequencies, thus minimizing the sensitivity to data harmonics of repetitive patterns and system noise (e.g. switching power supplies, or 50–60 Hz interference).

As pointed out above, to reduce sensitivity to harmonic interferers in-band of the control loop bandwidth, and minimize impact to the modulated data stream for improved performance, the repetition intervals may be staggered in a pseudo random manner as employed in spread spectrum techniques. Once a control loop has settled, its associated subroutine may be interrupted, and placed in a power down mode; the subroutine may be subsequently periodically rerun, to compensate for aging and temperature variations, with no penalty to operating margins. This allows for extremely low power operation.

When contrasted with conventional modulator control schemes, the present invention offers a number of improvements. First of all, the routine requires no adjustments, and is readily coupled with signal access points of currently commercially available MZ modulators. This allows it to be readily incorporated into an existing Mach-Zehnder modulator architecture with little or no impact on its physical dimensions. Secondly, the invention optimizes bias and gain settings, compensating for external component DC offsets, which are a function of selection, time or environment. Third, the invention is data rate insensitive. In addition, as pointed out above, the modulator control routine may be turned off for extended periods of time to save power.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. An apparatus for controlling the operation of a laser modulator for installation in a laser light beam path of a laser, and having a signal modulation port to which a laser modulator drive signal from a modulator driver is coupled, and a DC bias level port to which a DC bias level is coupled, said apparatus comprising:

an optical detector that is operative to monitor a modulated output beam of said laser modulator and generate an output signal representative of said modulated output beam; and a control unit which is operative to control operation of said modulator driver and said DC bias level, in accordance with said laser modulator's transfer function slope.

2. The apparatus according to claim 1, wherein said control unit is operative to control said drive signal and said DC bias level to said laser modulator in accordance with the transfer function slope of said modulator and change in sign of the derivative thereof for perturbations in control settings for said modulator.

3. The apparatus according to claim 1, wherein said control unit is operative to digitally execute a DC bias and gain control routine that employs monitored values of said output signal to derive a gain setting for said modulation drive signal and a bias level setting for said DC bias level.

4. The apparatus according to claim 3, wherein said control unit is operative to repetitively interrupt and restart said DC bias and gain control routine subsequent to convergence of said gain and bias level settings, at different intervals staggered in a random time fashion to achieve spectral dispersion of said gain and bias level settings, and provide insensitivity to periodic environmental noise.

5. The apparatus according to claim 4, wherein said DC bias and gain control routine contains respective DC bias and gain control subroutines, that are executed by said control unit in a time-interleaved manner, using monitored values of said output signal.

6. The apparatus according to claim 5, wherein said DC bias and gain control subroutines use the shape of the transfer function of said modulator to settle to the location where the derivative is zero, and the slope of an induced error signal has the correct sign.

7. The apparatus according to claim 5, wherein said laser modulator comprises a lithium niobate Mach-Zehnder laser modulator.

8. The apparatus according to claim 7, wherein said DC bias control subroutine is operative to sample and store the value of said output signal to provide a nominal signal value, and thereafter sample and store the value of said output signal to provide a delta signal, with a differential between said nominal signal value and said delta signal being representative of Mach-Zehnder transfer function slope, and wherein said DC bias level is adjusted in accordance with said differential.

9. The apparatus according to claim 8, wherein said gain control subroutine is operative to sample and store the value of said output signal to provide a nominal signal value, and thereafter sample and store the value of said output signal to provide a delta signal, with a differential between said nominal signal value and said delta signal being representative of Mach-Zehnder transfer function slope, and wherein said gain bias level is adjusted in accordance with said differential.

10. The apparatus according to claim 9, wherein said DC bias and modulator gain are offset by fractions of respectively associated nominal values.

11. An apparatus for controlling the operation of a Mach-Zehnder laser modulator for installation in a laser light beam path of a laser, and having a signal modulation port to which a laser modulator drive signal from a modulator driver is coupled, and a DC bias level port to which a DC bias level is coupled, said apparatus comprising:
   an optical detector that is operative to monitor a modulated output beam of said laser modulator and generate an output signal representative of said modulated output beam; and
   a digital processor-based control unit which is operative to control operation of said modulator driver and said DC bias level, by executing interleaved DC bias and gain control routines that are exclusive of tuning, using monitored values of said output signal to derive a gain setting for said modulation drive signal and a bias level setting for said DC bias level.

12. The apparatus according to claim 11, wherein said control unit is operative to repetitively interrupt and restart said DC bias and gain control routine subsequent to convergence of said gain and bias level settings, at different intervals staggered in a random time fashion to achieve spectral dispersion of said gain and bias level settings, and provide insensitivity to periodic environmental noise.

* * * * *